United States Patent [19]

Merz et al.

[11] Patent Number: 5,637,837

[45] Date of Patent: Jun. 10, 1997

[54] PLATFORM LIFTING AND LOWERING MECHANISM FOR WEIGHING APPARATUS

[75] Inventors: Ralph C. Merz; Thomas L. Haack, both of Columbus, Ohio

[73] Assignee: Mettler-Toledo, Inc., Worthington, Ohio

[21] Appl. No.: 228,034

[22] Filed: Apr. 15, 1994

[51] Int. Cl.⁶ .................................................. G01G 19/00
[52] U.S. Cl. .......................... 177/145; 177/134; 177/146; 298/17 B
[58] Field of Search ................................ 177/132–135, 177/145, 146, 154; 298/17 B

[56] References Cited

U.S. PATENT DOCUMENTS 4,039,093 8/1977 Schmitz, Jr. et al. ............... 214/130 R

OTHER PUBLICATIONS

Masstron Scale, Inc. drawing MC–30315–D (Apr. 18, 1984)
Toledo Scale drawing TC–302085–A (Aug. 31, 1989).

Primary Examiner—Michael L. Gellner
Assistant Examiner—Shih-yung Hsieh

[57] ABSTRACT

A weighing apparatus with pneumatic cylinder and piston assemblies for lifting a hinged platform includes a self-deploying mechanism to secure the platform in the raised position, a mechanism for remotely repositioning the self-deploying securing mechanism to enable lowering of the platform, and a control mechanism to remotely activate the lifting and securing of the platform and the unsecuring and lowering of the platform and to prevent unauthorized operation. The self-deploying securing mechanism includes an arm pivotally connected to the underside of the platform and arranged so that the other, free end of the arm pivots to a position to secure the platform when the platform is raised to a pre-determined height. The repositioning mechanism includes a pneumatic cylinder and piston assembly mounted perpendicular to the cylinder and piston assembly used to lift the platform. The piston of the repositioning cylinder and piston assembly is aligned to contact and reposition the free end of the platform securing arm to allow the platform to be lowered. The control mechanism includes a pneumatic controller equipped with a switch operated by a removable key.

10 Claims, 6 Drawing Sheets

PLATFORM LIFTING AND LOWERING MECHANISM FOR WEIGHING APPARATUS

BACKGROUND OF THE INVENTION

This invention relates to weighing apparatus having cylinder and piston assemblies for lifting a platform hinged to a base to provide access for cleaning, and more particularly to such an apparatus having an improved arrangement for remotely securing and releasing such hinged platform from a raised position.

Weighing apparatus with hinged platforms and powered lifting devices to enable easy access for cleaning and the like are now used in many applications. Such weighing apparatus typically includes a base mounted in the ground or floor, one or more load cells, a platform for receiving a load to be weighed and connected to one side of the base with a hinge, a powered platform lifting mechanism, such as one or more pneumatic cylinder and piston assemblies mounted between the base and the underside of the platform for lifting and lowering the platform about the hinge(s), and a controller to activate the lifting and lowering of the platform.

When thus equipped, such weighing apparatus provide relatively easy access for cleaning. However, the weighing platforms in such apparatus can still be very large and of great weight. In some applications, it is possible that power to the lifting mechanism could be lost while the platform is raised for cleaning. For example, the air line to the pneumatic cylinder and piston assemblies might be severed or an air compressor supplying pressure to the system might cease operating.

To secure the platform in the raised position, such apparatus have been equipped with a support bar to serve as a back up device to the powered lifting mechanism. Such support bars are typically constructed of metal and are fashioned in the shape of a rod or arm. One end of the support bar is typically pivotally connected to the underside of the platform on the edge opposite the hinge. When the platform is raised to the required height, the other, free end of the support bar is manually positioned by the scale operator or cleaning personnel onto a part of the base. The bar thus serves as a back up device to the powered lifting mechanism to secure the platform in the raised position during cleaning.

It will be apparent that such manually placed support bars are entirely dependant upon the operator for correct and proper utilization. Operators can fail to correctly place the support bar on the base. Operators can also fail to utilize the support bar each time the platform is raised for cleaning. Also disadvantageous, such manually placed support bars might require the operator to place a hand or other body part under a portion of the platform in order to place and remove the support bar.

SUMMARY OF THE INVENTION

An object of the present invention is to provide a weighing apparatus which substantially eliminates the problems and disadvantages referred to above with known weighing scales.

Another object of the present invention is to provide a weighing apparatus with a hinged platform and powered lifting mechanism which eliminates the need to manually place or remove a support bar to secure or release the platform in or from the raised position for lifting, cleaning, and lowering.

The inventors of the present invention have solved the problems presented by such manually placed support bars.

According to one aspect of the invention, there is provided an apparatus for weighing objects, including a base and a platform for receiving a load to be weighed. The platform is mounted to one side of the base with hinges and includes four load cells, one mounted inside each corner of the platform. To lift and lower the platform, the cylinder portions of two pneumatic cylinder and piston assemblies are pivotally mounted to the floor of the base and the piston arm portions are pivotally mounted to the underside of the platform. To secure the platform in the raised position, a platform securing mechanism is connected to each cylinder and piston used to lift and lower the platform.

Preferably, one end of a support bar is pivotally connected to the underside of the platform in close proximity to or in association with the piston arm pivot mounting of the cylinder used to lift and lower the platform. The support bar is arranged so that the other, free end of the support bar pivots to a position just above the head of the cylinder used to lift the platform in order to secure the platform when the platform is raised to a predetermined height.

According to another aspect of the invention, there is provided an apparatus for weighing objects, including a base and a platform for receiving a load to be weighed. The platform is mounted to one side of the base with hinges and includes four load cells, one mounted inside each corner of the platform. To lift and lower the platform, the cylinder portions of two pneumatic cylinder and piston assemblies are pivotally mounted to the floor of the base and the piston arm portions are pivotally mounted to the underside of the platform. To secure the platform in the raised position, a platform securing mechanism is connected to each cylinder and piston used to lift and lower the platform. A mechanism to reposition the platform securing mechanism and enable lowering of the platform is also provided.

Preferably, the repositioning mechanism includes another pneumatic cylinder and piston assembly mounted at or near the head of and perpendicular to each cylinder used to lift the platform and arranged so that its piston arm will contact a portion of the platform securing mechanism to reposition it away from the head of the lifting cylinder and hence away from the platform securing position to allow the platform to be lowered back into operational position.

DESCRIPTION OF A PREFERRED EMBODIMENT

Referring initially to FIGS. 1 to 4, there is shown a weighing apparatus, with platform partially raised, embodying the present invention, mounted in a pit. The weighing apparatus includes scale assembly 5, pneumatic control box 10, and display 15 for indicating the weight of an object being weighed.

Figure 1:
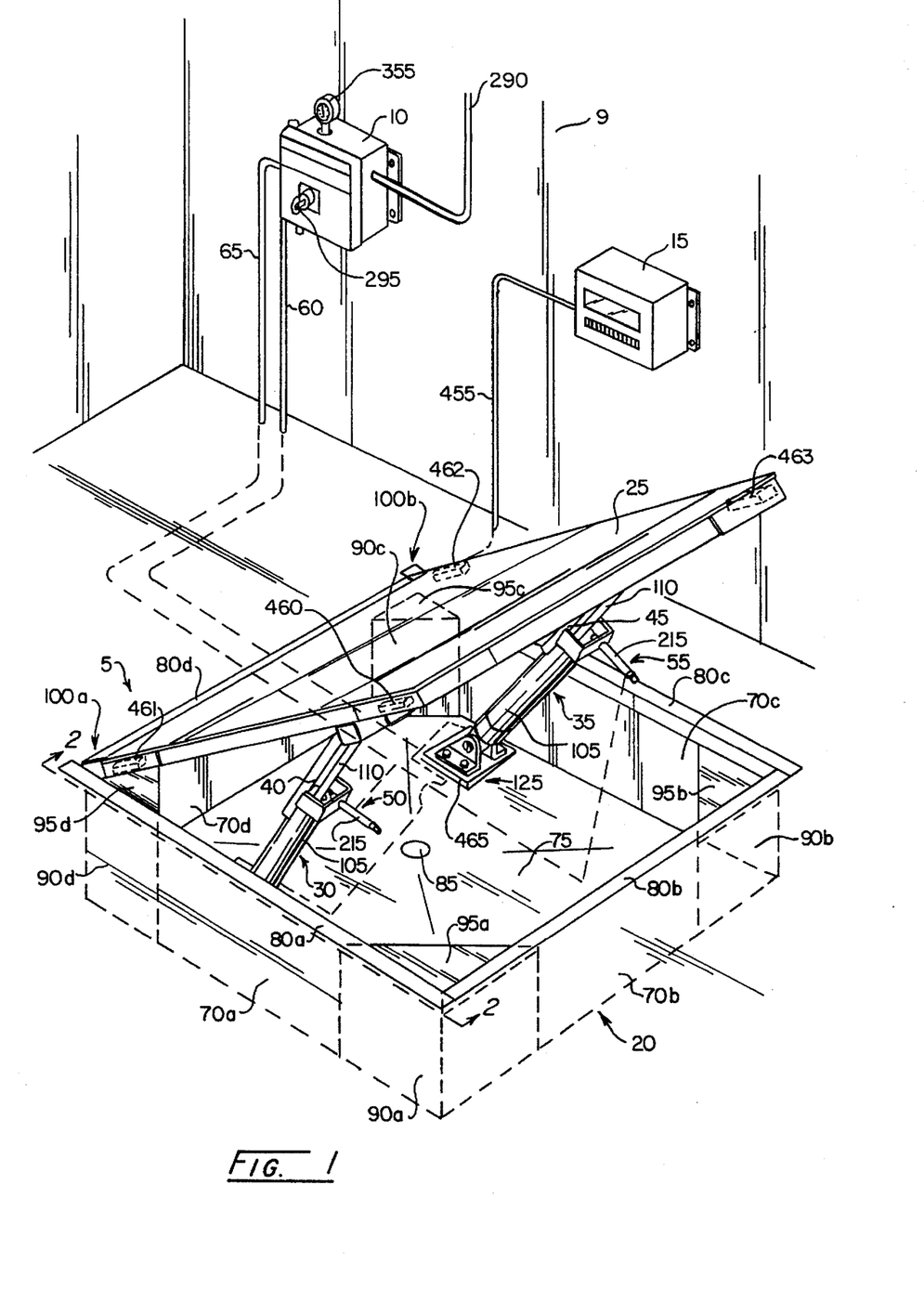
FIG. 1 is a perspective view of weighing apparatus, incorporating a preferred embodiment of the present invention.

Scale assembly 5 includes base 20 mounted in a pit, platform 25 for receiving an object to be weighed, four load cells 460–463 for producing a signal in accordance with the weight of the load applied and two pneumatic cylinder and piston assemblies 30, 35 for lifting and lowering platform 25. A pair of support bars 40, 45 are provided to secure platform 25 in the raised position and two smaller pneumatic cylinder and piston assemblies 50, 55 are provided to reposition support bars 40, 45 for lowering of platform 25. Two air lines 60, 65 supply air under pressure from control box 10 to cylinder and piston assemblies 30, 35, and 50, 55.

Base 20 can be constructed of many different types of materials and have differing shapes. The main requirement is that the material be of sufficient strength to bear the designed operating loads of scale assembly 5. In the preferred embodiment, base 20 is made of concrete, and includes four walls 70a–70d and floor 75 to form a square shaped box with four corners and an open top. Four metal formers or channel irons 80a–80d are laid into the concrete along all four sides of base 20 to maintain straight edge lines and minimize chipping of the concrete with age and use of the apparatus. Walls 70a–70d are mounted or poured in a prepared pit formed in a building floor or in the ground so that platform 25 is level with the floor or ground surface when in the lowered, operational weighing position. Base floor 75 is sloped downward toward the center to facilitate removal of liquids via drain 85.

To provide level and stable mounting for platform 25, four triangular shaped concrete columns 90a–90d are provided, one in each corner of base 20. Four triangular shaped metal brackets 95a–95d are rigidly mounted with concrete screws (not shown), one to the top of each concrete column 90a–90d. The height of each concrete column 90a–90d is calculated so that platform 25 rests atop brackets 95a–95d level with the ground and metal formers 80a–80d when in the lowered, operational weighing position.

Platform 25 includes an outer frame with a rigid sheet or plate of metal welded on top to form the weighing surface. Four load cells 460–463 are positioned within the frame work of platform 25, one load cell being mounted in each corner such that the load applied to the weighing surface is taken to ground through the load cell 460–463 via brackets 95a–95d and concrete columns 90a–90d.

Figure 2:
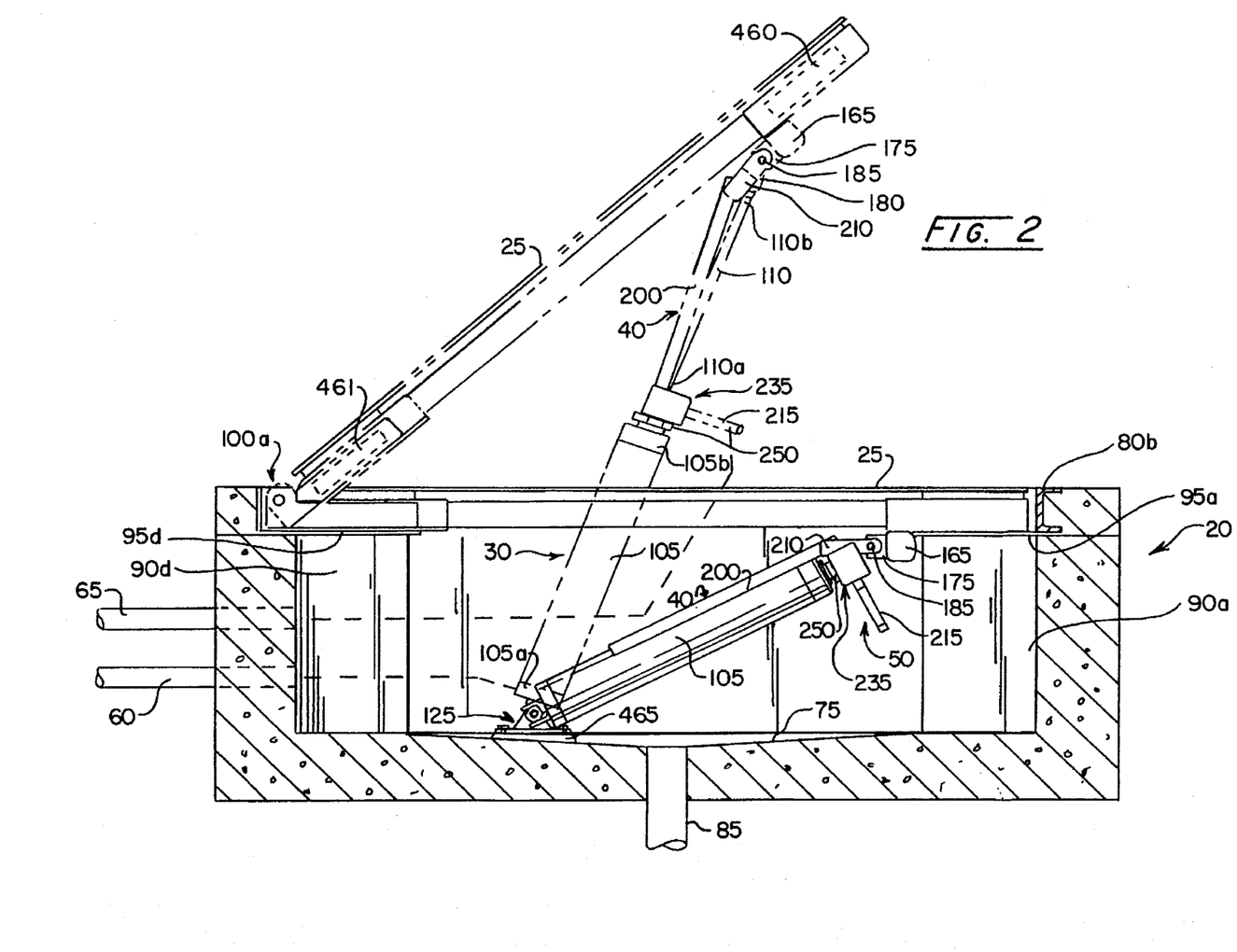
FIG. 2 is a horizontal sectional view on the line 2—2 of FIG. 1 showing in dashed lines the platform in the lifted, secured position for cleaning and in solid lines the lowered, operational position for weighing.

Platform 25 is connected to base 20 by means of two spaced apart hinges 100a–100b. As seen in FIG. 2, hinges 100a–100b are recessed into the edge of platform 25 and base 20 so that when platform 25 is in the lowered, operational weighing position, platform 25 and hinges 100a–100b are flush with the ground. Hinges 100a–100b allow platform 25 to be lifted and lowered about the hinged side of base 20 for cleaning.

As shown in FIG. 1, to lift and lower platform 25 about hinges 100a–100b, scale assembly 5 is provided with two cylinder and piston assemblies 30, 35. Cylinder and piston assemblies 30, 35 are pneumatically powered double acting, no spring, assemblies such as a double acting, three inch bore, sixteen inch stroke type available from Reece Fluid Power Company, Toledo, Ohio and sold under the tradename Bimba.

Figure 3:
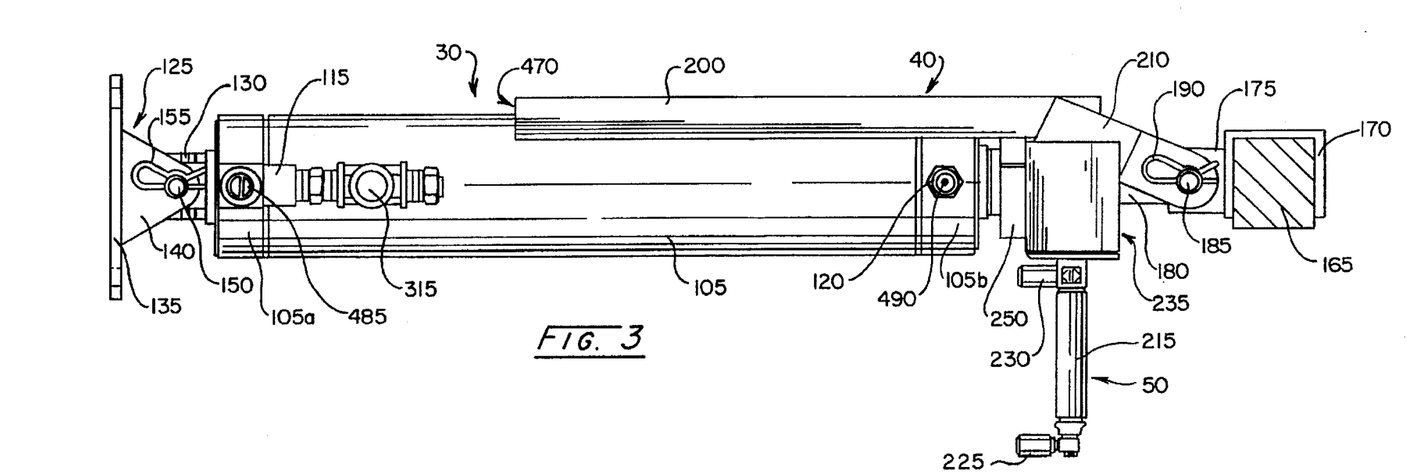
FIG. 3 is a side view of one cylinder and piston assembly employed in the weighing apparatus of FIG. 1.
Figure 4:
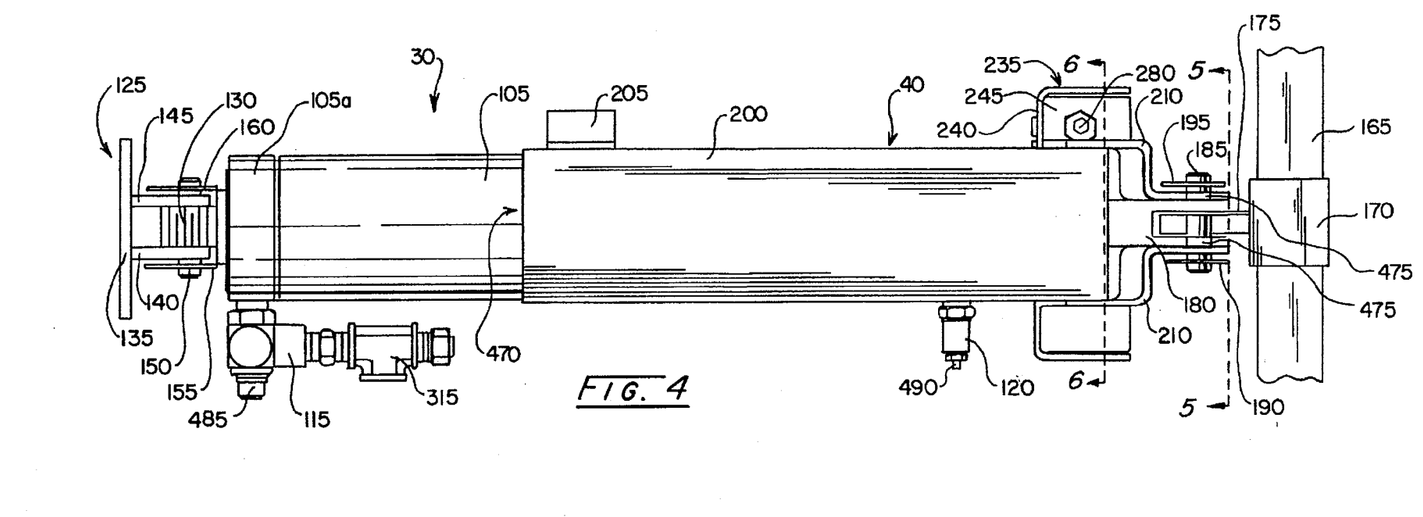
FIG. 4 is a top view of the cylinder and piston assembly of FIG. 3.

As shown in FIGS. 3 to 4, cylinder and piston assembly 30 (assembly 35 being identical) includes a cylinder 105 and an extendible piston arm 110 (FIG. 2). Cylinder 105 includes a base portion 105a and a head portion 105b. Base portion 105a is provided with an air flow control valve 115 which is used to supply air into the assembly to extend piston arm 110. Head portion 105b is also provided with an air flow control silencer valve 120, used for controlling the rate piston arm 110 is extended.

As shown in FIG. 2, cylinder 105 is pivotally connected to floor 75 of base 20 by mounting bracket 125. As seen in FIG. 4, the end of base portion 105a is provided with an extension 130. Extension 130 is provided with bolt hole (not shown) transverse therethru. Mounting bracket 125 is formed of metal with a base portion 135 and two vertical members 140, 145. Base portion 135 is rigidly fastened to floor 75 of scale base 20 with conventional concrete bolts (shown in FIG. 2 but not numbered). Vertical members 140, 145 are also each provided with bolt hole (not shown) transverse therethru. Extension 130 of cylinder 105 is inserted between vertical members 140, 145 of mounting bracket 125. The bolt hole of extension 130 is lined up with the holes of vertical members 140, 145. A rod 150 is inserted into and thru the holes of mounting bracket 125 and extension 130 and retained in place by cotter pins 155, 160. To counter the slope of floor 75, a wedged shaped piece of metal 465 is mounted between bracket 125 and floor 75. Cylinder 105 is thus pivotally connected to floor 75 of base 20.

Referring again to FIG. 2, piston arm 110 includes an enclosed end 110a and a free end 110b. Free end 110b of piston arm 110 is pivotally connected to the underside of platform 25. A square shaped metal bar 165 is welded onto the underside of platform 25, near the edge opposite the side hinged to base 20. As seen in FIG. 3 and FIG. 4, a bracket 170 is welded onto bar 165. Bracket 170 is constructed of metal and is shaped with a channel to mate around bar 165. Bracket 170 is provided with an extension member 175 which contains a hole (not shown) transverse therethru.

As shown in FIG. 4, a clevis 180, with bolt holes thru each extended portion, is threaded onto free end 110b of piston arm 110. Clevis 180 is inserted around extension member 175 and the holes of clevis 180 are lined up with the hole of extension member 175. A rod 185 is inserted into and thru the clevis and extension member holes and retained in position with cotter pins 190, 195. Thus connected, piston arm 110 is pivotally connected to the underside of platform 25.

It will be appreciated that to maximize the mechanical advantage and hence lifting power of cylinder and piston assemblies 30, 35, bar 165 is welded as close to the outside edge of platform 25 as possible while still allowing enough clearance so that neither bar 165 nor bracket 170 contacts base 20 when platform 25 is raised or lowered. In the preferred embodiment, two cylinder and piston lifting assemblies are utilized. Although it will be appreciated that a single assembly could be used or more than two assemblies could be used. A bracket 170 is used for each assembly. Each bracket 170 is positioned on the underside of platform 25 preferably about one third the length in from the corner of that side of platform 25. It will be appreciated that with two cylinder and piston assemblies, such positioning will evenly distribute the weight of platform 25 to each cylinder and piston assembly 30, 35.

It will be appreciated that the number, size and placement of the cylinder and piston assemblies used to lift the weighing platform will vary depending on the size and weight of platform 25. With smaller weighing apparatus, one cylinder and piston assembly, with the cylinder base pivotally mounted substantially midpoint under the platform and with the piston arm pivotally connected to the underside of the platform substantially midpoint along that side of the platform could be utilized. With larger weighing apparatus, larger and additional cylinder and piston assemblies may be necessary or desired. The placement of each assembly will depend on the size and weight of the platform and on the number and size of the cylinder and piston assemblies being used.

With cylinder and piston assemblies 30, 35 pivotally mounted to base 20 and pivotally mounted to the underside of platform 25, it will be appreciated that when air is supplied to the cylinders, the piston arms will extend, lifting platform 25 about hinges 100a–100b.

Referring again to FIGS. 1 to 4, support bars 40, 45 are associated with cylinder and piston assemblies 30, 35, respectively, and are pivotally connected to the underside of platform 25. Support bars 40, 45 are used to secure platform 25 in the raised position in the event air pressure is lost to cylinder and piston assemblies 30, 35.

As best seen in FIGS. 3 and 4, support bar 40 (support bar 45 being identical) includes two components welded together at an angle. The first component of support bar 40 is channel arm 200. Channel arm 200 is made from a rectangular shaped piece of metal which has had both long sides bent at ninety degrees to form a channel 470. Channel 470 is slightly wider than the diameter of cylinder 105. Channel arm 200 is also provided with extension 205. As best seen in FIG. 4, extension 205 is formed from a small rectangular shaped piece of metal bent at ninety degrees into an "L" shape. The base of the "L" is welded onto a side of channel arm 200 in a position to be described below. The second component of support bar 40 is bracket segment 210. Bracket segment 210 is made from two pieces of metal which have been bent into a modified "S" shape. One end of each of these two "S" shaped pieces is welded at an angle onto the end of channel arm 200 such that the two pieces which form bracket segment 210 now form a modified "Y". The angle that bracket segment 210 is welded onto channel arm 200 can best be viewed in FIG. 3. Each non-welded end of bracket segment 210 has a hole 475 drilled therethru.

Referring to FIG. 4, the two ends of bracket segment 210 are positioned on the outside of clevis 180 and extension member 175. The holes in the non-welded ends of bracket segment 210 are lined up with the holes of piston arm clevis 180 and with the hole of extension member 175. As discussed above, a rod 185 is inserted therethru and retained in place by cotter pins 190, 195. Support bar 40 is thus pivotally connected to the underside of platform 25.

As seen in FIG. 2, thus connected, when platform 25 is lifted about hinges 100a–100b, support bar 40 will freely pivot about rod 185 and channel arm 200 will ride along the top surface of cylinder 105. When platform 25 is lifted a sufficient height, the free end of channel arm 200 will slide into position along piston arm 110 and just above head 105b of cylinder 105. In such position, should air pressure to cylinder 105 be lost, platform 25 will drop the slight distance until the free end of channel arm 200 contacts head 105b of cylinder 105.

The length of channel arm 200 and of bracket segment 210 and the angle these two pieces form when welded together will depend upon the size of the cylinder and piston assembly utilized and upon how high the platform is to be lifted and secured for cleaning. It will be appreciated that the angle and lengths will be chosen such that channel arm 200 will rest substantially above, along and parallel to the length of cylinder 105 when platform 25 is in the lowered position for weighing and such that free end of channel arm 200 will deploy into a position just above head 105b of cylinder 105 when platform 25 is lifted to the predetermined desired height for cleaning. It will be apparent that the number and size of the support bars utilized will vary depending on the size and weight of weighing platform and on the size and number of cylinder and piston assemblies.

Figure 5:
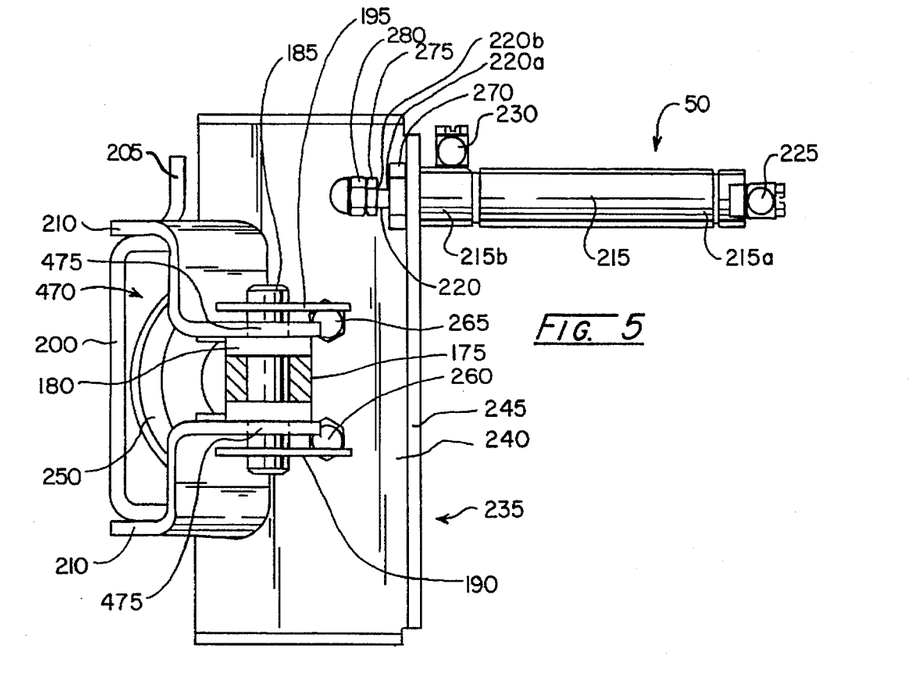
FIG. 5 is a vertical sectional view of the cylinder and piston assembly taken generally on the line 5—5 of FIG. 4.

The mechanism used to reposition support bar 40 out and away from the platform securing position described above and shown in FIG. 2 to allow platform 25 to be lowered is best seen in FIG. 5. As shown there a second, smaller pneumatic cylinder and piston assembly 50 is mounted perpendicular to cylinder 105. Cylinder and piston assemblies 50, 55 are pneumatically powered, double acting, no spring, assemblies such as a stainless steel, nine sixteenths inch bore, two inch stroke type available from Reece Fluid Power Company, Toledo, Ohio. Assembly 50 (assembly 55 being identical) includes a cylinder 215 and an extendible piston arm 220. Cylinder 215 further includes a base portion 215a and a head portion 215b. Piston arm 220 includes an enclosed end 220a and a free end 220b. Base portion 215a of cylinder 215 is provided with a valve 225, and head portion 215b is provided with valve 230. It will be appreciated that when air is connected to and supplied into cylinder 215 via valve 225, piston arm 220 will extend. Likewise, when air is no longer supplied via valve 225 but is supplied via valve 230, piston arm 220 will retract.

Figure 6:
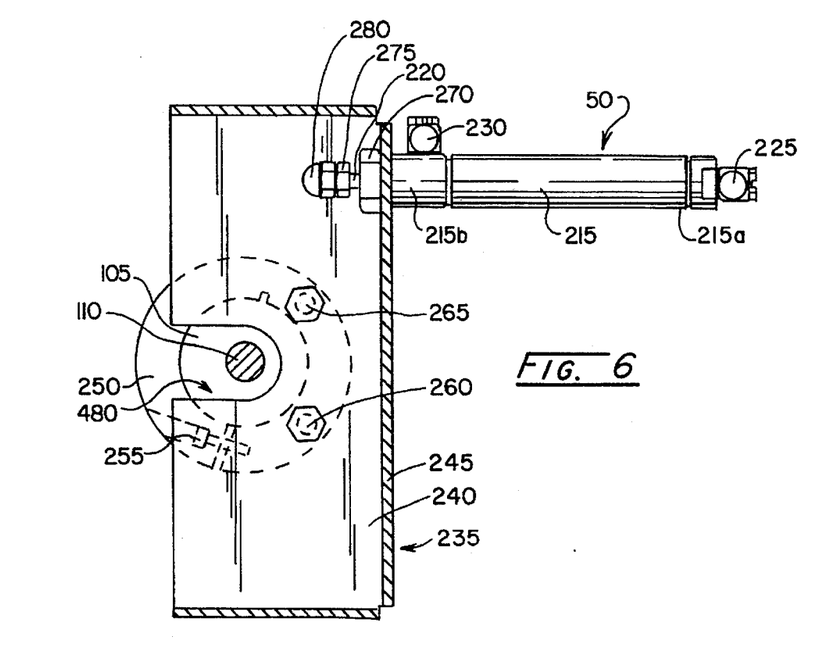
FIG. 6 is a vertical sectional view taken generally on the line 6—6 of FIG. 4 with certain parts removed for clarity.

As shown in FIG. 6, a mounting bracket 235 is constructed from a rectangular piece of sheet metal bent at ninety degrees to form two surfaces, cylinder head mounting surface 240 and small cylinder assembly mounting surface 245. A cylinder head clamping collar 250, such as a 1.5 inch bore type available from Ohio Transmission & Pump Company, Columbus, Ohio is connected to the head portion 105b of cylinder 105 and held in place via screw 255. A slot 480 is cut into cylinder head mounting surface 240 and sized and positioned to allow piston arm 110 of cylinder 105 to extend and retract without contacting mounting bracket 235. Mounting bracket 235 is connected to the clamping collar 250 with two hex screws 260, 265.

As shown in FIG. 5, a hole is cut into the small cylinder assembly mounting surface 245 and head portion 215b of cylinder 215 is inserted therethru and secured in position with hex nut 270. Another hex nut 275 and acorn nut 280 are threaded onto the free end 220b of piston arm 220. The positioning of cylinder 215 is chosen so that when piston arm 220 is extended, acorn nut 280 will line up with and contact extension 205 of channel arm 200 and push the free end of support bar 40 out and away from head 105b of cylinder 105, thereby unsecuring platform 25 for lowering.

Figures 7, 9:
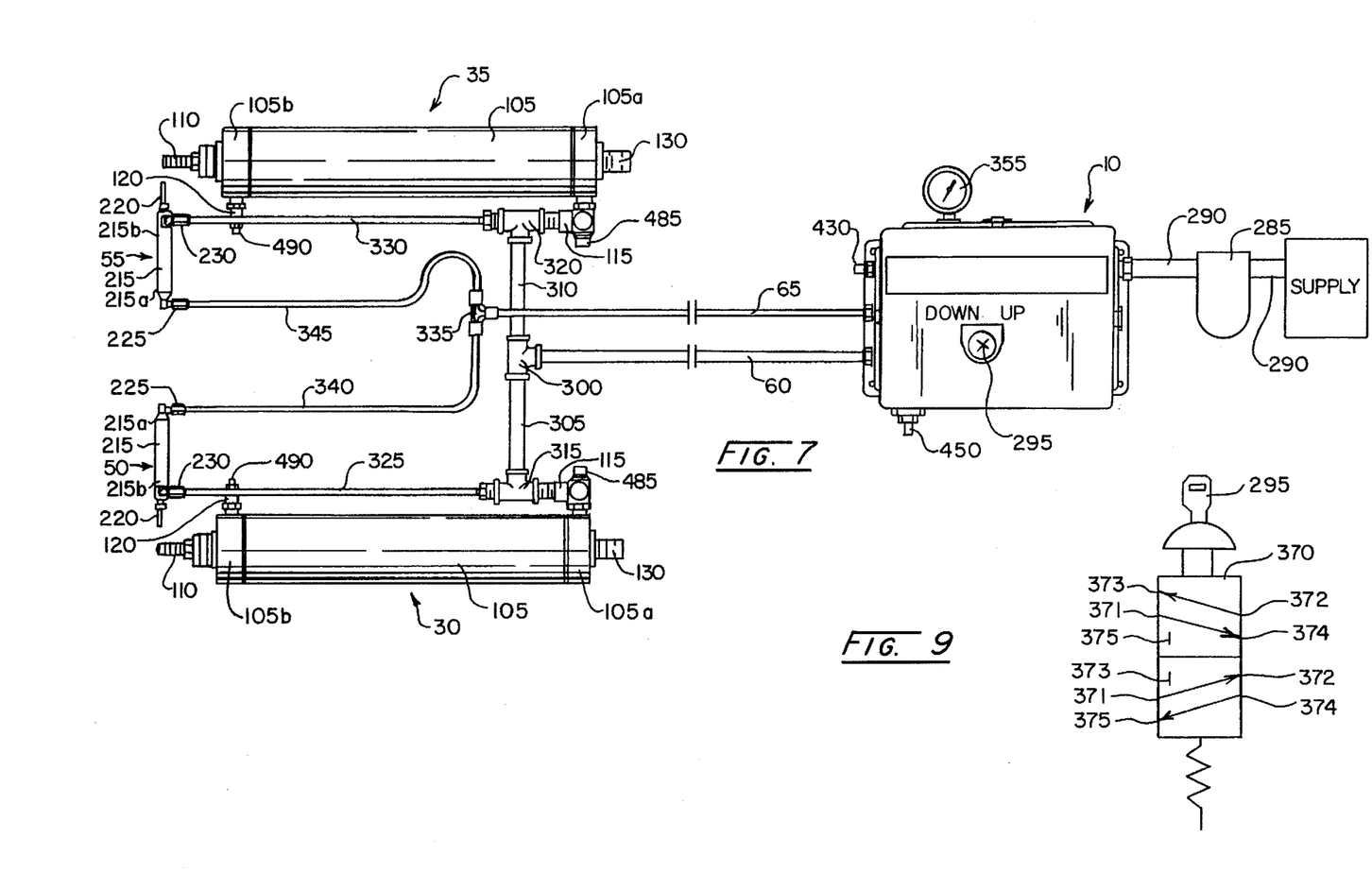
FIG. 7 is a schematical representation of the pneumatic connections of the cylinder and piston assemblies.
FIG. 9 is a schematical representation of a four way valve employed in the control box of FIG. 8.

The pneumatic connections to all cylinder and piston assemblies to lift the platform and to release the support bars and lower the platform are shown in FIG. 7. As shown there, air under pressure, from an external source labeled SUPPLY, is supplied thru air filter 285 via air line 290 into control box 10, the internal workings and layout of which will be described below. The size of air line 290 will depend on the amount and source of external air supply. In the preferred embodiment, one quarter inch nylo-flux tubing, such as is available from The Isaacs Company, Columbus, Ohio, is used for air line 290, and an external source of dry, clean air at a pressure of 90 pounds per square inch is utilized. It will be appreciated that the amount of air pressure required will vary depending on the weight of the platform, the capacity of the scale, and the size of the cylinders used.

Control box 10 is a pneumatic controller activated by a removable key switch. To lift platform 25, an operator rotates key 295 into the "UP" position. In this position, air pressure is supplied by control box 10 thru air line 60. Air line 60 is constructed of three eights inch pneumatic hose or tubing.

As seen in FIG. 1, control box 10 is preferably mounted on a nearby wall 9, remote from scale assembly 5. Air line 65 exits control box 10 and is also preferably attached to wall 9. Air line 60 leads down to and under the ground surface and through wall 70d into base 20 of scale assembly 5. As seen in FIG. 7, once inside base 20, air line 60 is connected to a three eights inch "T" shaped joint connector 300. Connector 300 diverts the air supply into and through air lines 305, 310, also three eights inch tubing, and into another three eights inch "T" shaped joint connectors 315, 320. Connectors 315, 320 are connected to and divert air supply into valves 115 in the base of cylinder and piston assemblies 30, 35. In the preferred embodiment, valves 115 are also equipped with an adjustable throttle 485 which can be used to fine tune the amount of air admitted out of cylinder and piston assemblies 30, 35 and thus control the rate of descent of platform 25. In the preferred embodiment, valves 120 of cylinders 105 are also equipped with adjustable throttles 490 which can be used to fine tune the amount of air allowed to escape from cylinders 105 and thus control the rate of ascent of platform 25.

Connectors 315, 320 carry air supply into air lines 325, 330 which are one quarter inch tubing, which in turn are connected to valves 230 of cylinder and piston assemblies 50, 55. As explained above, small cylinder and piston assemblies 50, 55 are double acting cylinders. When air is supplied thru head portion 215b of cylinder 215 piston arm 220 will retract.

The pneumatic connections necessary to lower platform 25 are shown in FIG. 5. To lower platform 25, the operator rotates key 295 to the "down" position. In this position, air supply is no longer diverted into air line 60. As will be explained below, any air pressure in air line 60 is vented back into control box 10 and then out into the outside environment and air supply is now diverted into air line 65. Air line 65 is constructed of one quarter inch tubing. Like air line 60, and as shown in FIG. 1, air line 65 exits control box 10, is preferably mounted to wall 9, and leads down to and under the ground and through wall 70d into base 20. It will be appreciated that in weighing applications where heavy machinery might damage an air line laid along and on top of the ground, air lines 60, 65 are preferably laid beneath the ground. The depth air lines 60, 65 are buried will depend on the flooring material present and the type of traffic it is subjected to.

Referring again to FIG. 7, air line 65 is run into base 20 and connected to a one quarter inch "T" shaped joint connector 335. Connector 335 connects air supply to air lines 340, 345 which are both one quarter inch tubing. Air lines 340, 345 carry air supply into valves 225 of cylinder and piston assemblies 50, 55. As described above, when air pressure is supplied to base portion 215a of cylinder 215 piston arm 220 will extend pushing the free end of support bar 40 out and away from the head portion 105b of cylinders 105 so that the platform is not locked in the raised position.

It should be noted that when cutting the air lines and fittings, to avoid pressure imbalances when lifting or lowering platform 25, equal lengths of three eights inch tubing should be used for air lines 305, 310 and equal lengths of one quarter inch tubing should be used for air lines 325, 330 and for air lines 340, 345.

The control of air supply to air lines 60, 65 and automatic lifting and lowering of platform 25 is accomplished by control box 10. The pneumatic connections and design of control box 10 can best be seen in FIG. 8.

Control box 10 can be constructed of sheetmetal or stainless steel, or a similar material suitable for the environment where the device is to be used. Control box 10 is fashioned by bending the sheetmetal into the shape of a box with an open front, four sides 10a–10d, and base 11. Sides 10a, 10c are each provided with a flange 12, 13 for mounting control box 10 to wall 9 with screws or bolts (not shown). A cover 14, formed from like material and sized to fit over the open front portion of control box 10 is mounted to side 10d of control box 10 with hinge 18. While cover 14 is shown open in FIG. 8, cover 14 is secured closed to sides 10a, 10b, 10c with three latches 16a, 16b, 16c.

A hole is cut into side 10a of control box 10 and a one quarter inch NPT bulkhead adapter/connector 17, commonly available, is installed therein to receive air line 290 (FIG. 5). The size and type of bulkhead adapter/connector used will depend on the size and type of air line 290 utilized. An air regulator 350, such as a one quarter inch NPT Watts #R119-02C available from The Isaacs Company, Columbus, Ohio, is positioned inside control box 10. Air regulator 350 is of the type with three connectors 351, 352, 353 and an adjustable throttle valve 354. Connector 351 is mated with connector 17. The air supply is thus admitted into regulator 350 thru connector 351. An air pressure gauge 355 is mounted to the outside of control box 10 on side 10b with another bulkhead adapter and connector and connected via air line 360 made of one quarter inch nylo-flux tubing to regulator 350 via connector 352. The amount of air pressure admitted into the system can thus be easily read by an operator and varied by adjusting throttle valve 354. Air supply exits air regulator 350 thru air line 365, also one quarter inch tubing, which is mated to connector 353.

A four way valve 370, such as a one quarter inch NPT Clippard #FV-5P available from The Isaacs Company, Columbus, Ohio, is mounted on the inside of cover 14 and mated thru a hole in cover 14 with a switch (not shown) operated by a removable key, such as a key twist valve #PL-T3K-B available from The Isaacs Company, Columbus, Ohio, which is mounted on the outside of cover 14. A removable key 295 (FIG. 1) will operate the switch and thus valve 370. Valve 370 has five openings, four of which are each provided with a one eight inch to one quarter inch connector 371, 372, 374, 375, such as are available from The Isaacs Company, Columbus, Ohio, for receiving one quarter inch air lines. The fifth valve opening 373 of valve 370 does not have such a connector but is left open to the inside of control box 10. The operation of valve 370 can best be seen in FIG. 9.

Four way valve 370 contains four air channels, generally represented by arrows. These air channels operate in pairs of two to direct the flow of air into and out of valve 370. The top half of FIG. 9, denoted by the area above the center line, shows the orientation of the air channels to lift platform 25. One air channel will connect valve opening 373 to valve opening 372. The other air channel will connect valve opening 371 to valve opening 374. The bottom half of FIG. 9, denoted by the area below the center line, shows the orientation of the air channels to lower platform 25. In this mode, one air channel will now connect valve opening 371 to valve opening 372 and the other air channel will connect valve opening 375 to valve opening 374.

Referring again to FIG. 8, air line 365 is mated to the connector of valve opening 371. Air line 380, also one quarter inch tubing, is mated to the connector of valve opening 372. Air line 380 leads to and is mated to another bulkhead adapter and connector 385 which is mounted through a hole in side 10c of control box 10. The portion of connector 385 on the outside of control box 10 is in turn mated to air line 65 which directs air supply to cylinder and piston assemblies 50, 55 for lowering platform 25. Air line 390, also one quarter inch tubing, is mated to the connector of valve opening 374. Air line 390 leads to and is mated with another bulkhead adapter and connector 400 which is mounted through a hole in side 10c of control box 10. The portion of connector 400 on the outside of control box 10 is mated to air line 60 which directs air supply to cylinder and piston assemblies 30, 35 for lifting platform 25.

Figure 8:
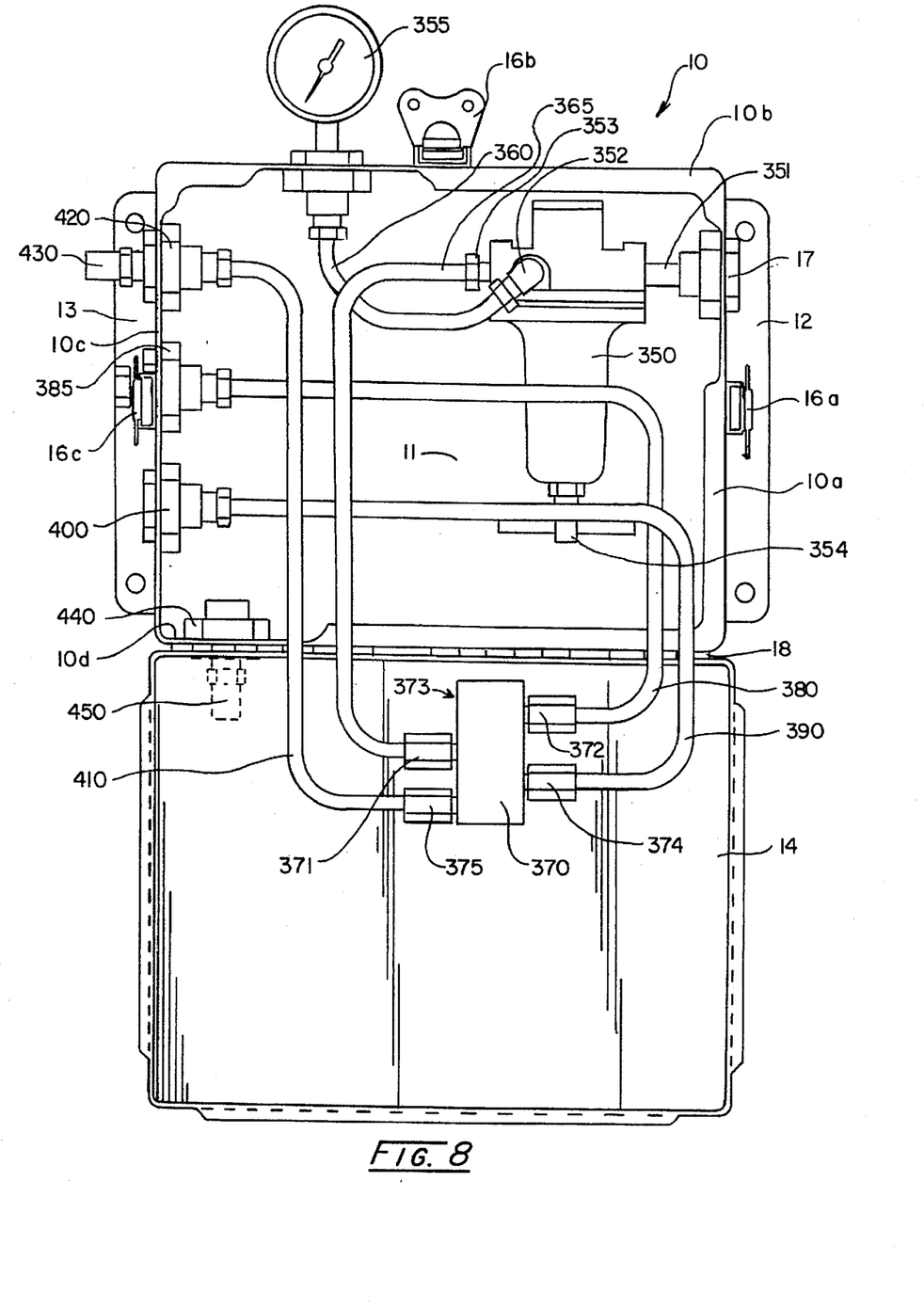
FIG. 8 is a front view of a control box to control lifting and lowering of the weighing platform.

Air line 410, also one quarter inch tubing, is mated to the connector of valve opening 375. Air line 410 leads to and is mated with another bulkhead adapter and connector 420 which is mounted through a hole in side 10c of control box 10. The portion of connector 420 on the outside of control box 10 is mated to an air muffler 430, such as a one quarter inch NPT exhaust silencer available from The Isaacs Company, Columbus, Ohio, which minimizes the noise of any air diverted therethru. Bulkhead adapter and connector 440 is mounted thru a hole in side 10d of control box 10. The portion of connector 440 on the outside of control box 10 is mated to another air muffler 450 which will vent any air vented back out valve opening 373 into the inside of control box 10. Air muffler 450 will also minimize the noise of any air vented therethru.

Thus configured, when the scale operator or cleaning personnel position key 295 to the "up" position, air will be supplied to air line 60. As explained above, when air pressure is supplied thru air line 60, the piston arms of cylinder and piston assemblies 30, 35 will extend, lifting platform 25. Simultaneously, air will be supplied to the head portions of cylinders 215 causing the piston arms of cylinder and piston assemblies 50, 55 to retract allowing support bars 40, 45 to pivot and the free ends thereof to ride along the top surface of cylinders 105. When platform 25 is lifted a sufficient amount, the free ends of support bars 40, 45 will pivot into position just above heads 105b of cylinders 105. While the vast majority of air pressure will be used to raise platform 25, some exhaust pressure may make its way back thru the system and thru air line 65 and into control box 10. Any such air pressure will enter four way valve 370 and exit via valve opening 373 into the inside of control box 10. As air pressure builds inside control box 10, excessive pressure will be vented to the outside environment via air muffler 450.

When platform 25 is raised to it's securing position for cleaning, the operator or cleaning personnel removes key 295 from control box 10, leaving the switch in the "up" position. This will serve to "lock out" the system and prevent non-authorized operation of control box 10. It will be appreciated that with the key removed, air is continually supplied to platform 25, holding platform 25 in the raised position. Should power be lost to the system, platform 25 will drop only a slight distance until the free end of support bars 40, 45 contacts head portion 105b of cylinders 105.

Essentially the opposite happens to lower platform 25. After cleaning, the operator or cleaning personnel will re-insert key 295 into the key switch of control box 10 and turn the switch to the "down" position. Turning the key will reposition four way valve 370. Now air supply will be diverted into air line 65. As has been explained above, when air pressure is supplied thru air line 65, piston arms 220 of cylinders 215 will extend causing hex nut 280 to contact extension arm 205 of support bars 40, 45 and push the free end thereof about rod 185 and out away from head 105b of cylinders 105. Simultaneously, air line 60 which diverts air supply to cylinder and piston assemblies 30, 35 is now vented back into four way valve 370 of control box 10 and out valve position 375 thru air line 410 and out thru air muffler 430 into the outside environment. With support bars 40, 45 no longer in the securing position and with air pressure to cylinder and piston assemblies 30, 35 being vented back out, platform 25 will lower back into base 20 and into the operational weighing position. After the operator turns key 295 to the "down" position, the operator need not wait until platform 25 is completely lowered before removing key 295.

The rate of ascent of platform 25 can be controlled by varying the amount of external air pressure supplied, by adjusting throttle 354 of air regulator 350, and by adjusting throttle valve 490 on valve 120 of cylinder 105. The rate of descent of platform 25 can be similarly controlled by adjusting throttle valve 485 on valve 115 of cylinder 105.

When platform 25 is in its operational weighing position, the weight of a load on platform 25 will be sensed by load cells 460–463 which are connected to display 15 via electrical connection line 455 (FIG. 1). Line 455 is preferably run from scale assembly 5 under the ground to wall 9 and into display 15. Display 15 then indicates the weight of the load applied.

It will be appreciated that the objects of this invention can be achieved with lifting/lowering and securing/releasing means powered by sources other than air. For example, hydraulic powered cylinder and pistons would be suitable.

What is claimed is:

1. Weighing apparatus comprising:
   a base having at least one side,
   a platform for receiving a load to be weighed having a top side and an underside and at least two ends, a free end and an end pivotally connected to said one side of said base,
   at least one load cell connected between said platform and said base for producing a signal in accordance with the weight of the load applied,
   means connected between the base and the platform for lifting and lowering said free end of said platform,
   platform securing means having a free end and an end pivotally connected to said underside of said platform, said platform securing means being of a predetermined length and arranged to pivot into a position to secure said free end of said platform in position when said platform is raised to a predetermined height,
   means connected to said lifting and lowering means including an extendible and retractable arm for repositioning said securing means to enable lowering of said free end of said platform, and
   automatic control means connected to said repositioning arm for extending and retracting said repositioning arm.

2. Weighing apparatus as claimed in claim 1 wherein said lifting and lowering means comprises at least one cylinder and piston.

3. Weighing apparatus as claimed in claim 2 wherein said cylinder is pivotally connected to said base and said piston is pivotally connected to said underside of said platform.

4. Weighing apparatus as claimed in claim 3 wherein said securing means comprises an arm extending parallel to said cylinder and piston lifting and lowering means and pivotally connected to said underside of said platform and to said piston pivot connection.

5. Weighing apparatus as claimed in claim 4, wherein said securing arm is of a pre-determined length and is shorter than the length of said piston when said platform is raised to a pre-determined height.

6. Weighing apparatus as claimed in claim 1 wherein said control means includes means for locking out use thereof.

7. Weighing apparatus as claimed in claim 6 wherein said lock out means includes a switch activated by a removable key.

8. Weighing apparatus as claimed in claim 1, wherein said repositioning means includes at least one cylinder and piston.

9. Weighing apparatus as claimed in claim 8 wherein said lifting and lowering means comprises at least one cylinder and piston, said cylinder portion pivotally connected to said base and said piston portion pivotally connected to said underside of said platform.

10. Weighing apparatus as claimed in claim 9 wherein the cylinder portion of said cylinder and piston repositioning means is connected to the cylinder portion of said cylinder and piston lifting and lowering means, the long axis of said cylinder and piston repositioning means being perpendicular to the long axis of said cylinder and piston lifting and lowering means and wherein said piston of said repositioning means is engagable with said securing means.

* * * * *